United States Patent
Kullin et al.

(10) Patent No.: US 11,002,314 B2
(45) Date of Patent: May 11, 2021

(54) SPHERICAL ROLLER BEARING

(71) Applicant: Aktiebolaget SKF, Gothenburg (SE)

(72) Inventors: Arne Lars Jonas Kullin, Landvetter (SE); Marcus Loof, Nol (SE); Yvonne Rydberg, Kärna (SE)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 16/773,718

(22) Filed: Jan. 27, 2020

(65) Prior Publication Data

US 2020/0318685 A1    Oct. 8, 2020

(30) Foreign Application Priority Data

Apr. 8, 2019    (DE) .......................... 102019204973.7

(51) Int. Cl.
*F16C 19/38*    (2006.01)
*F16C 33/36*    (2006.01)
*F16C 33/48*    (2006.01)
*F16C 33/58*    (2006.01)

(52) U.S. Cl.
CPC .............. *F16C 33/48* (2013.01); *F16C 19/38* (2013.01); *F16C 33/585* (2013.01)

(58) Field of Classification Search
CPC ........ F16C 19/38; F16C 19/23; F16C 19/082; F16C 19/086; F16C 19/088; F16C 19/36; F16C 19/4617; F16C 19/4623; F16C 19/4629; F16C 19/4635; F16C 19/4682; F16C 19/48; F16C 19/49; F16C 19/494; F16C 19/495; F16C 19/497; F16C 19/498; F16C 33/585
See application file for complete search history.

(56) References Cited

U.S. PATENT DOCUMENTS 4,629,339 A * 12/1986 Morinaga ............. F16C 23/086
                                                            384/576
6,125,520 A * 10/2000 Lindsey ............... B23D 31/002
                                                            29/412

FOREIGN PATENT DOCUMENTS

| DE | 102013218184 A1 | * | 3/2015 | ............. F16C 33/48 |
| DE | 102016223408 A1 | * | 5/2018 | ......... F16C 33/4682 |
| JP | 2006194289 A | * | 7/2006 | ............. F16C 33/494 |
| JP | 2007127167 A | * | 5/2007 | ............. F16C 33/48 |
| JP | 2007303608 A | * | 11/2007 | ............. F16C 33/48 |
| JP | 2009068592 A | * | 4/2009 | ............. F16C 33/48 |

* cited by examiner

*Primary Examiner* — Phillip A Johnson
(74) *Attorney, Agent, or Firm* — Garcia-Zamor Intellectual Property Law; Ruy Garcia-Zamor; Bryan Peckjian

(57) ABSTRACT

A spherical roller bearing providing an inner ring, an outer ring, rollers for rolling on raceways arranged on the rings, and a cage for holding the rollers spaced apart from each other. The cage having an annular core and a plurality of bars delimitating a plurality of pockets for the rollers, the annular core including two side faces from which the bars protrude axially outwardly, the inner and outer rings being rotatable with respect to each other around a bearing axis. The annular core further provides a plurality of spacing elements that protrude from the side faces of the annular core designed to come into contact with side faces of the rollers in order to prevent the rollers from moving axially towards the center of the bearing.

11 Claims, 3 Drawing Sheets

SPHERICAL ROLLER BEARING

CROSS-REFERENCE TO RELATED APPLICATIONS

This application claims priority to German Patent Application no. 102019204973.7, filed Apr. 8, 2019, the contents of which is fully incorporated herein by reference.

TECHNICAL FIELD OF THE INVENTION

The invention concerns a spherical roller bearing.

BACKGROUND OF THE INVENTION

Spherical roller bearings have two rows of symmetrical rollers, a common sphered outer ring raceway and two inner ring raceways inclined at an angle to the bearing axis. The center point of the sphere in the outer ring raceway is at the bearing axis.

Spherical roller bearings comprise one or two cages, of the window or prong type.

Spherical roller bearings can also comprise a floating guide ring or a central fixed flange or rib which guides the unloaded rollers so that they enter the load zone in the optimal axial position. The floating guide ring is centered either on the inner ring or on the cage(s).

The floating guide ring prevents the unloaded rollers to move axially towards the center of the bearing, so that they are not squeezed between the raceways when they enter the load zone.

Improvements are possible.

SUMMARY OF THE INVENTION

It is a particular object of the present invention to provide a spherical roller bearing with an inner ring, an outer ring, rollers for rolling on raceways arranged on the rings, and a cage for holding the rollers spaced apart from each other.

According to the invention, the cage comprises an annular core and a plurality of bars delimitating a plurality of pockets for the rollers, and the annular core comprises two side faces from which the bars protrude axially outwardly.

The inner and outer rings are rotatable with respect to each other around a bearing axis XX'.

Still according to the invention, the annular core also comprises a plurality of spacing elements which protrude from the side faces and which are designed to come into contact with side faces of the rollers in order to prevent the rollers from moving axially towards the center of the bearing.

Thanks to the invention, an excessive movement of the unloaded rollers towards the center of the bearing is prevented, so that there is no squeezing of the rollers or damage of the raceways.

Thanks to the invention, the spherical roller bearing is lighter and cheaper than spherical rollers bearings of the prior art.

According to other aspects of the invention which are advantageous, but not compulsory, such a spherical roller bearing may incorporate one or several of the following features:

the cage further comprises two annular borders which connect together end portions of the bars located on the same side axially;

the spacing elements are integrally formed with the annular core or are spheres embedded in the annular core;

the spacing elements are retained inside the annular core with or without a degree of freedom with respect to the annular core;

the spacing elements are made from metal or ceramic material;

the side faces of the annular core are flat and inclined with respect to the bearing axis XX' by an angle A smaller or equal to 90°;

each roller is able to come into contact with one or two spacing elements;

the cage is made from a synthetic material.

BRIEF DESCRIPTION OF THE DRAWINGS

The present invention and its advantages will be better understood by studying the detailed description of specific embodiments given by way of non-limiting examples and illustrated by the appended drawings on which.

DETAILED DESCRIPTION OF THE INVENTION

Figure 1:
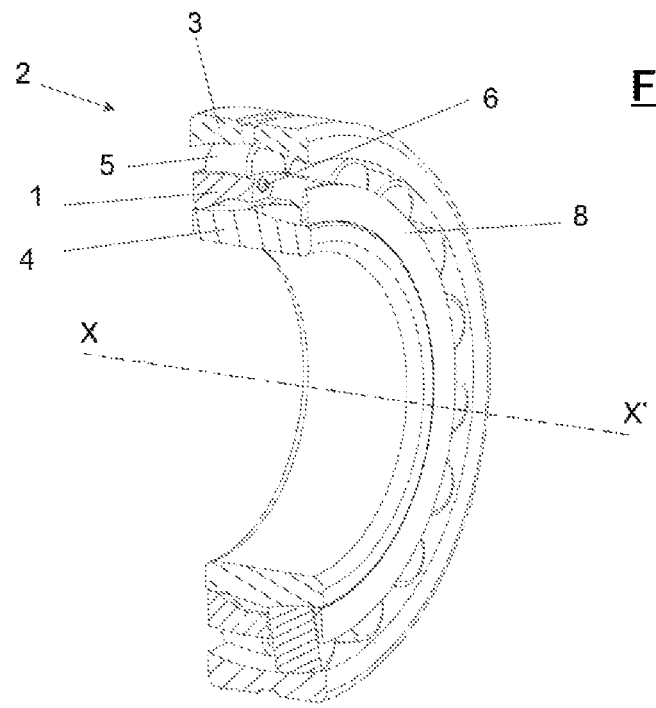
FIG. 1 shows a spherical roller bearing according to the invention in perspective and in a longitudinal cross section according to a plane containing the axis XX' of symmetry of the bearing, with a cage according to a first embodiment of the invention.
Figure 2:
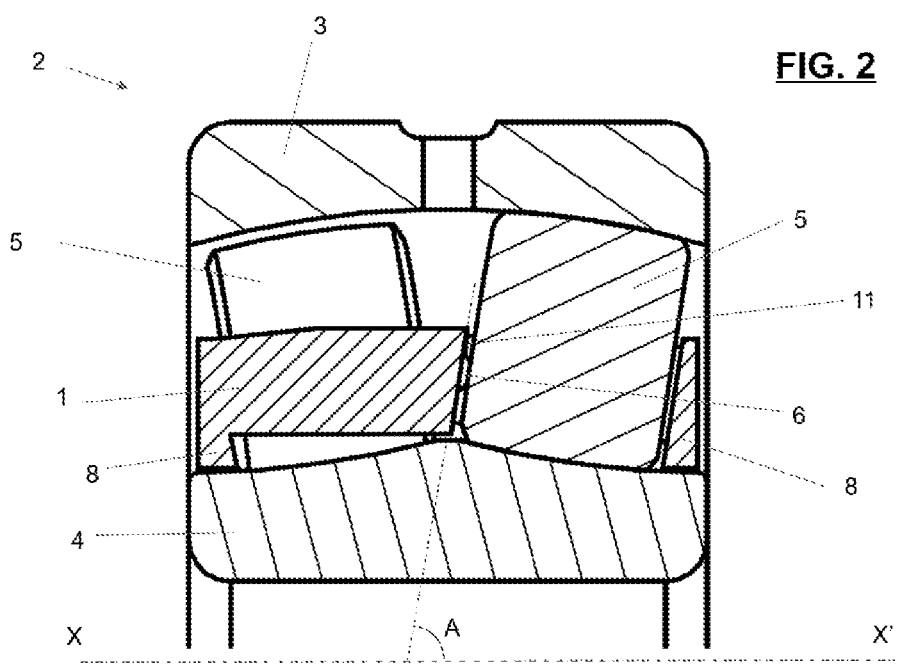
FIG. 2 in an enlarged view of the longitudinal cross section of the bearing of FIG. 1.

FIGS. 1 and 2 illustrate a spherical roller bearing 2 comprising an inner ring 4 and an outer ring 3, both rings being rotatable around a longitudinal axis XX' which is an axis of symmetry of the bearing.

In what follows, the word axial or axially refers to a direction parallel to the axis XX', and the word radial or radially refers to a direction which is perpendicular to the axis XX'.

The spherical roller bearing 2 also comprises a cage 1 for holding spherical rollers 2 spaced apart from each other. The rollers are arranged in two rows which are axially adjacent.

The outer ring 3 has, on its inner radial periphery, a raceway in the form of a truncated sphere and where the spherical rollers can roll.

The inner ring 4 has, on its outer radial periphery, two raceways, each in the form of a truncated sphere, and which are axially adjacent. The rollers of the same row can roll on only one of the two raceways of the inner ring.

Advantageously, the cage is made from synthetic material. For instance, the cage is made from a polymer such as PA66 or PEEK. According to another embodiment, the cage is made from a composite material comprising such a polymer.

Alternatively, the cage is made from a metallic material such as steel, cast iron or brass.

As best visible on FIGS. 3 to 6, the cage 1 comprises an annular core 7 which extends circumferentially, and a plurality of bars 9 extending axially from the annular core 7 and located at intervals in the circumferential direction. The annular core 7 and the bars 9 define a plurality of pockets 10 for receiving the rollers 2. The annular core 7 is located axially in the center of the cage.

Each pocket 10 receives one roller 5.

Figure 3:
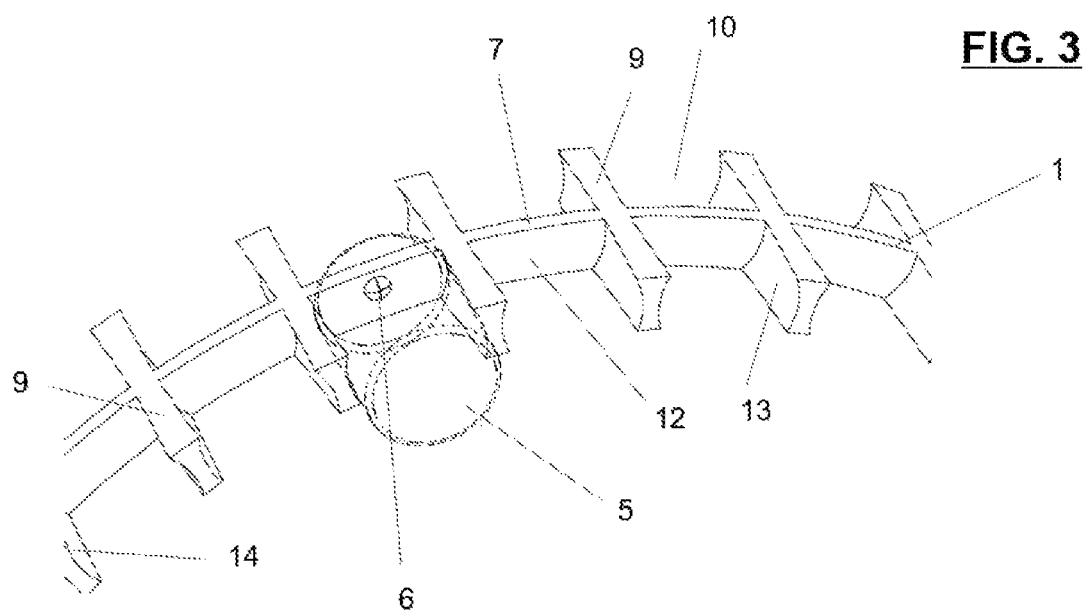
FIG. 3 shows partially and in perspective a second embodiment of a cage according to the invention.
Figure 4:
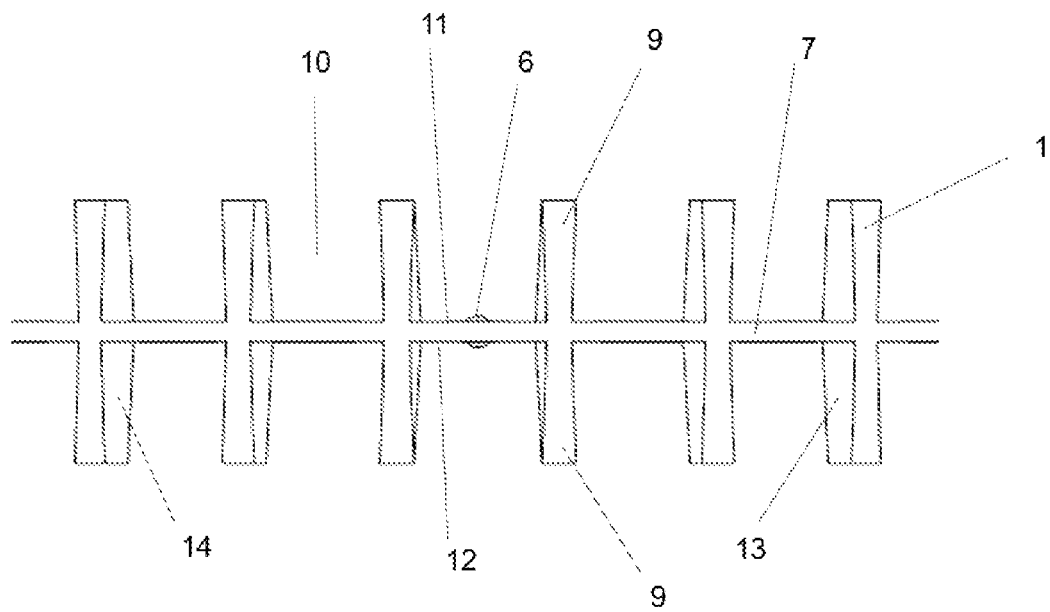
FIG. 4 shows partially and from a top view the second embodiment of FIG. 3.
Figure 5:
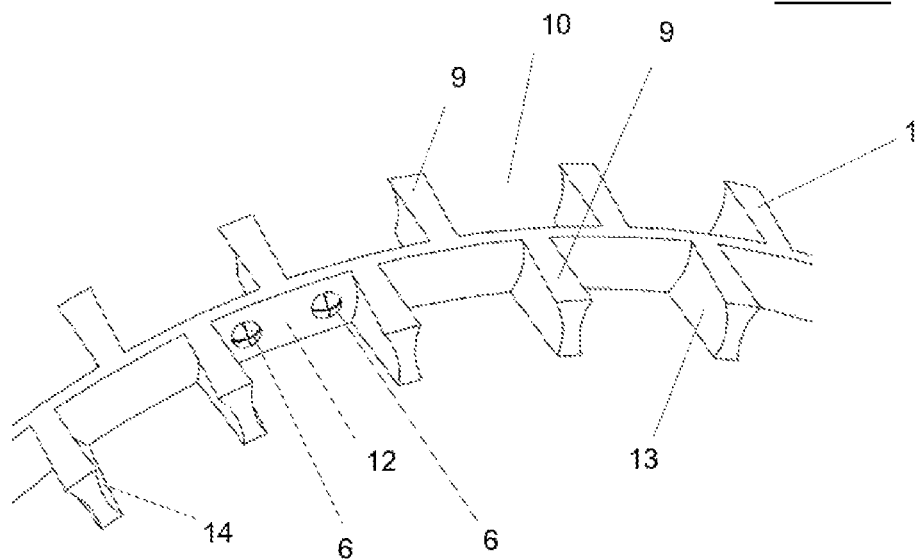
FIG. 5 shows partially and in perspective a third embodiment of a cage according to the invention.
Figure 6:
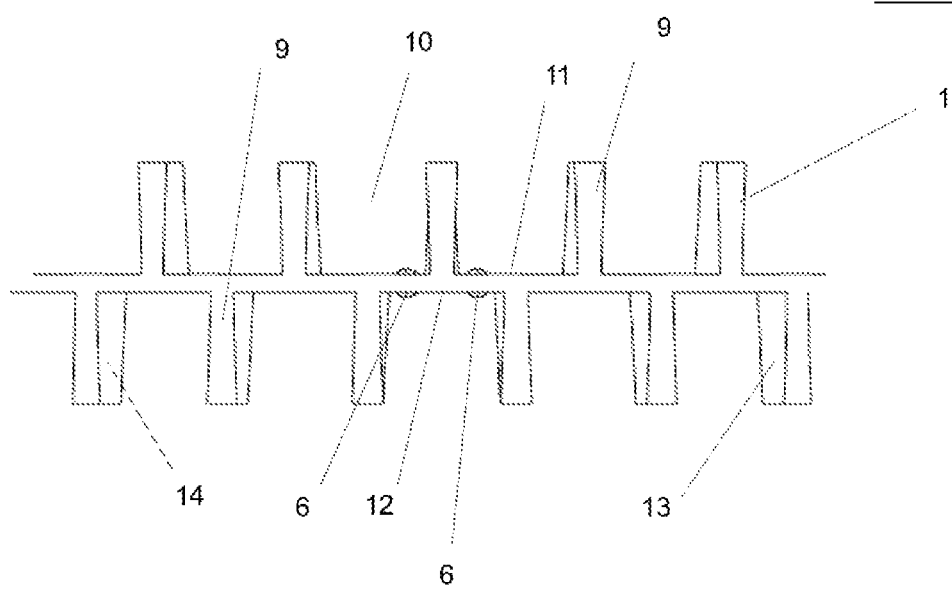
FIG. 6 shows partially and from a top view the third embodiment of FIG. 5.

For the sake of simplicity and clarity, FIG. 3 shows only one roller and FIGS. 4 to 6 none.

Each roller 5 comprises an outer spherical surface designed to roll on the raceways of the inner and outer rings and to be in contact with the guiding surfaces 13,14 of the bars 9. Each roller 5 also comprises two side faces which are preferably flat and perpendicular to the axis of rotation of the roller.

Each bar has two guide faces 13, 14 for guiding in rotation the spherical rollers 2. Each guide face 13, 14 is in the form of a truncated sphere.

The annular core 7 of the cage 1 comprises two side faces 11, 12 which extend circumferentially. The bars 9 extend axially outwardly from the two side faces 11, 12.

Preferably, the side faces 11, 12 are flat, and are inclined with respect to the bearing axis XX' by an angle A smaller or equal to 90°.

In some preferred embodiments of the invention, such as the one illustrated on FIGS. 1 and 2, the angle A is strictly smaller than 90° and preferably comprised between 45° and 85°.

Alternatively, in other preferred embodiments, such as the ones illustrated on FIGS. 3 to 6, the angle A is equal to 90°.

Alternatively, the side faces 11, 12 are not flat and have instead a cambered surface, for instance in the form of a truncated sphere.

In the preferred embodiment of the cage illustrated on FIGS. 1 and 2, the cage further comprises two annular borders 8 which extend circumferentially.

The annular borders 8 are parallel with each other and are also parallel with the annular core 7. The annular core 7 is located axially between the two annular borders 8.

Each annular border 8 connects together end portions of the bars 9 located on the same side axially.

The annular borders 8 contribute to the holding of the rollers 5 inside the pockets 10. The annular borders 8 limit the axially movement of the rollers inside the pockets towards the outside of the bearing.

The annular core 7 of the cage 1 comprise a plurality of spacing elements 6 which protrude from the side faces 11, 12 and which limit the axial movement of the rollers.

The spacing elements are designed to come into contact with a side face of the rollers.

The spacing elements prevent an excessive movement of the unloaded rollers towards the center of the bearing. Thanks to this, the rollers are prevented from being squeezed which could block in rotation the bearing or damage the rollers or the raceways of the rings.

The spacing elements according to the present invention perform the same function as the guiding ring of the prior art, but the weight and the cost of this new solution are drastically reduced.

Preferably, the side faces of the rollers are flat and the spacing elements are in the form of a truncated sphere, so that the contact between one spacing element and one roller is limited to a point, the friction between the rollers and the side faces is kept low.

Preferably, the spacing elements are made from metal. Alternatively, the spacing elements are made from ceramic material.

In the illustrated preferred embodiments of the invention, the spacing elements are spheres embedded in the annular core 7 of the cage. The spheres are located in the thickness of the annular core so as to simultaneously protrude from the two side faces 11, 12.

The spacing elements are retained inside the annular core 7, with or without a degree of freedom with respect to the annular core. This degree of freedom can be a rotation.

In non-illustrated preferred embodiments of the invention, the spacing elements 6 are integrally formed with the annular core of the cage.

Alternatively, some or all the spacing elements are located on side faces of the rollers.

Each roller is able to come into contact with one or more spacing elements.

In the embodiment illustrated on FIGS. 3 and 4, each roller is able to come into contact with one spacing element.

In the embodiment illustrated on FIGS. 5 and 6, each roller is able to come into contact with two spacing elements.

In non-illustrated embodiments, each roller is able to come into contact with at least three spacing elements.

The invention claimed is:

1. A spherical roller bearing comprising:
    an inner ring,
    an outer ring,
    rollers for rolling on raceways arranged on the inner ring and the outer ring, and
    a cage for holding the rollers spaced apart from each other,
    the cage comprising an annular core and a plurality of bars delimitating a plurality of pockets for the rollers, the annular core comprising a first side face and a second side face from which the bars protrude axially outwardly,
    the inner and outer rings being rotatable with respect to each other around a bearing axis,
    wherein the annular core further comprises a plurality of spacing elements that protrude from the first side face and the second side face of the annular core,
    wherein the spacing elements are spheres embedded in the annular core,
    wherein the spacing elements are designed to come into contact with an exterior surface of the rollers in order to prevent the rollers from moving axially towards the center of the bearing.

2. The bearing according to claim 1, wherein the cage further comprises two annular borders that connect together end portions of the bars located on the same side axially.

3. The bearing according to claim 1, wherein the spacing elements are integrally formed with the annular core.

4. The bearing according to claim 1, wherein the spacing elements are retained inside the annular core with no degrees of freedom with respect to the annular core.

5. The bearing according to claim 1, wherein the spacing elements are retained inside the annular core with or without a degree of freedom with respect to the annular core.

6. The bearing according to claim 1, wherein the spacing elements are made from metal material.

7. The bearing according to claim 1, wherein the first and second side faces of the annular core are flat and inclined with respect to the bearing axis by an angle (A) smaller or equal to 90°.

8. The bearing according to claim 1, wherein each roller is able to come into contact with one spacing element.

9. The bearing according to claim 1, wherein each roller is able to come into contact with two spacing elements.

10. The bearing according to claim 1, wherein the cage is made from a synthetic material.

11. A spherical roller bearing comprising:
an inner ring,
an outer ring,
rollers for rolling on raceways arranged on the inner ring and the outer ring, and
a cage for holding the rollers spaced apart from each other,
the cage comprising an annular core and a plurality of bars delimitating a plurality of pockets for the rollers, the annular core comprising a first side face and a second side face from which the bars protrude axially outwardly,
the inner and outer rings being rotatable with respect to each other around a bearing axis,
wherein the annular core further comprises a plurality of spacing elements that protrude from the first side face and the second side face of the annular core,
wherein the spacing elements are spheres,
wherein the spacing elements are made from ceramic material,
wherein the spacing elements are designed to come into contact with an exterior surface the rollers in order to prevent the rollers from moving axially towards the center of the bearing.

* * * * *